United States Patent
Al-Qasim et al.

(10) Patent No.: US 12,031,414 B2
(45) Date of Patent: Jul. 9, 2024

(54) SEQUESTRATION OF CARBON IN SUBTERRANEAN VOLUMES BY MINERAL PRECIPITATION

(71) Applicant: Saudi Arabian Oil Company, Dhahran (SA)

(72) Inventors: Abdulaziz S. Al-Qasim, Dammam (SA); Anton Manakhov, Ivanovo (RU); Yuguo Wang, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 17/948,835

(22) Filed: Sep. 20, 2022

(65) Prior Publication Data
US 2024/0093576 A1    Mar. 21, 2024

(51) Int. Cl.
*E21B 41/00* (2006.01)
*C01B 32/60* (2017.01)

(52) U.S. Cl.
CPC .......... *E21B 41/0064* (2013.01); *C01B 32/60* (2017.08)

(58) Field of Classification Search
CPC ..... E21B 41/0064; C01B 32/60; C01B 15/10; C01B 32/97; B65G 5/005
See application file for complete search history.

(56) References Cited

U.S. PATENT DOCUMENTS

| | | | | |
|---|---|---|---|---|
| 2002/0182011 A1* | 12/2002 | Brown | .................. | E21B 43/168 405/129.25 |
| 2009/0169452 A1* | 7/2009 | Constantz | .......... | B01D 53/1493 423/220 |
| 2010/0098492 A1* | 4/2010 | Dickinson, III | ...... | E21B 33/138 405/53 |
| 2011/0091366 A1* | 4/2011 | Kendall | .................. | C04B 14/04 423/220 |
| 2015/0098889 A1* | 4/2015 | Jung | .................. | B01D 53/1493 252/190 |

(Continued)

FOREIGN PATENT DOCUMENTS

| WO | WO 2011050385 | 5/2011 |
|---|---|---|
| WO | WO 2022051598 | 3/2022 |

OTHER PUBLICATIONS

Al-Yaseri et al., "Enhancing CO2 Storage Capacity and Containment Security of Basaltic Formation using Silica Nanofluids," International Journal of Greenhouse Gas Control 112, 2021, 103516, 6 pages.

(Continued)

*Primary Examiner* — Silvana C Runyan
(74) *Attorney, Agent, or Firm* — Fish & Richardson P.C.

(57) ABSTRACT

A method for subsurface sequestration of carbon in a subterranean zone includes forming a fluid-filled volume in the subterranean zone by injecting an aqueous into the subterranean zone and injecting a mixture comprising silicate nanoparticles suspended in an acidic solution having a pH of less than 4. Carbon in the form of carbon dioxide is injected into the fluid-filled volume such that a least a portion of the carbon is sequestered by precipitation of carbonate minerals. At least a portion of the carbonate minerals are formed from reaction of metal cations with bicarbonate formed from the carbon dioxide, and least a portion of the metal cations are a product of decomposition of the silicate nanoparticles in the acidic solution.

12 Claims, 6 Drawing Sheets

(56) References Cited

U.S. PATENT DOCUMENTS

2024/0018849 A1     1/2024    Patel et al.

OTHER PUBLICATIONS

Bachu and Dusseault, "Underground Injection of Carbon Dioxide in Salt Beds," Developments in Water Science, 2005, 52:637-648, 12 pages.

Gislason et al., "A brief history of CarbFix: Challenges and victories of the project's pilot phase," Energy Procedia, Jul. 2018, 146:103-114, 10 pages.

Matter et al., "Rapid carbon mineralization for permanent disposal of anthropogenic carbon dioxide emissions," Science, Jun. 2016, 352(6291), 4 pages.

Mishra et al., "Basalt nanoparticle reinforced hybrid woven composites: Mechanical and thermo-mechanical performance," Fibers and Polymers, 2017, 18:2433-2442, 10 pages.

Peter et al., "A Review of Studies on CO2-Brine-Rock Interaction in Geological Storage Process," Geosciences, 2022, 12(4):168, 26 pages.

Zhao et al., "Amine Phase-Transfer Chemistry: A Green and Sustainable Approach to the Nonbiological Mineralization of CO2," ACS Sustainable Chemistry & Engineering, 2018, 6(5):7105-7108, 8 pages.

International Search Report and Written Opinion in International Appln. No. PCT/US2023/033142, dated Dec. 13, 2023, 16 pages.

Kelland et al., "Increased yield and CO2 sequestration potential with the C4 cereal Sorghum bicolor cultivated in basaltic rock dust-amended agricultural soil," Global Change Biology, Apr. 21, 2020, 26(6):3658-3676, 19 pages.

Olsson et al., "Metal scavenging by calcium carbonate at the Eyjafjallajökull volcano: A carbon capture and storage analogue," Chemical Geology, Jul. 15, 2014, 384:135-148, 14 pages.

Schaef et al., "Dissolution of Columbia River Basalt under mildly acidic conditions as a function of temperature: Experimental results relevant to the geological sequestration of carbon dioxide," Applied Geochemistry, May 2009, 24(5):980-987, 8 pages.

\* cited by examiner

SEQUESTRATION OF CARBON IN SUBTERRANEAN VOLUMES BY MINERAL PRECIPITATION

TECHNICAL FIELD

This document relates to methods and compositions for sequestering carbon dioxide in subterranean formations.

BACKGROUND

Anthropogenic carbon dioxide emissions continue to rise steadily. Potential global climate change associated with greenhouse gas (GHG) emissions can only be mitigated by reducing atmospheric carbon levels through emissions cuts or carbon capture utilization and storage (CCUS) technologies.

The aggressive goal to reduce atmospheric carbon dioxide accumulation will be very challenging to meet without significant technological developments for CCUS. Technologies for capturing and storing carbon dioxide, including those that can be retrofitted to existing structures, will be critical to achieving the global climate change mitigation goals. Underground geological sequestration may be of particular interest for CCUS due to the potential large storage capacity of geological formations and the permanence of such sequestration.

SUMMARY

This disclosure describes sequestration of carbon in subterranean formations.

Certain aspects of the subject matter herein can be implemented as a method for subsurface sequestration of carbon in a subterranean zone. The method includes forming a fluid-filled volume in the subterranean zone by injecting an aqueous solution into the subterranean zone and injecting into the fluid-filled volume a mixture comprising silicate nanoparticles suspended in an acidic solution having a pH of less than 4. The method further includes injecting carbon in the form of carbon dioxide into the fluid-filled volume; and sequestering a least a portion of the carbon in the fluid-filled volume by precipitation of carbonate minerals in the fluid-filled volume. At least a portion of the carbonate minerals are formed from reaction of metal cations with bicarbonate formed from the carbon dioxide, and least a portion of the metal cations are a product of decomposition of the silicate nanoparticles in the acidic solution.

An aspect combinable with any of the other aspects can include the following features. The mixture and the carbon dioxide can be injected into the fluid-filled volume through a common tubing disposed within a wellbore.

An aspect combinable with any of the other aspects can include the following features. At least a portion of the carbon dioxide can be included in the mixture comprising the silicate nanoparticles.

An aspect combinable with any of the other aspects can include the following features. The fluid-filled volume of the subterranean zone can be a salt cavern.

An aspect combinable with any of the other aspects can include the following features. The method can further include determining a change in a chemical or physical characteristic of a return flow of fluid from the fluid-filled volume and, based on such determination, modifying a volume or composition of the mixture.

An aspect combinable with any of the other aspects can include the following features. The aqueous solution, the mixture, and the carbon dioxide can be injected into the fluid-filled volume through a common tubing disposed within a wellbore.

An aspect combinable with any of the other aspects can include the following features. The mixture can include silicate nanoparticles in the acidic solution comprises at least a portion of the aqueous solution.

An aspect combinable with any of the other aspects can include the following features. The acidic solution can comprise 0.1 M sulphuric acid.

An aspect combinable with any of the other aspects can include the following features. The acidic solution can comprise 0.1 M hydrochloric acid.

An aspect combinable with any of the other aspects can include the following features. The acid solution can comprise 0.1 M carbonic acid.

An aspect combinable with any of the other aspects can include the following features. The silicate nanoparticles can comprise milled basalt particles.

An aspect combinable with any of the other aspects can include the following features. The method can further include injecting an amine into the fluid-filled volume, the amine reactive with at least a portion of the carbon dioxide to form at least a portion of the bicarbonate.

Certain aspects of the subject matter herein can be implemented as a system. The system includes a tubing disposed in a wellbore drilled into a subterranean zone and a salt cavern formed by injection of an aqueous solution into a subterranean zone through the tubing. The system is configured to inject, into the salt cavern through the tubing, carbon in the form of carbon dioxide and a fluid mixture comprising silicate nanoparticles suspended in an acidic solution having a pH of less than 4, thereby sequestering a least a portion of the carbon in the subterranean zone by precipitation of carbonate minerals in the salt cavern. At least a portion of the carbonate minerals are formed from reaction of metal cations with bicarbonate formed from the carbon dioxide, wherein at least a portion of the metal cations are a product of decomposition of the silicate nanoparticles in the acidic solution.

An aspect combinable with any of the other aspects can include the following features. At least a portion of the carbon dioxide can be included in the mixture comprising the silicate nanoparticles.

An aspect combinable with any of the other aspects can include the following features. The mixture comprising silicate nanoparticles in the acidic solution can comprise at least a portion of the aqueous solution.

An aspect combinable with any of the other aspects can include the following features. The system can be configured such that the aqueous solution, the mixture, and the carbon dioxide are injected into the fluid-filled volume through the tubing.

An aspect combinable with any of the other aspects can include the following features. The acidic solution can comprise 0.1 M sulphuric acid.

An aspect combinable with any of the other aspects can include the following features. The acidic solution can comprise 0.1 M hydrochloric acid.

An aspect combinable with any of the other aspects can include the following features. The acid solution can comprise 0.1 M carbonic acid.

An aspect combinable with any of the other aspects can include the following features. The mixture comprising silicate nanoparticles in the acidic solution can comprise at least a portion of the aqueous solution.

An aspect combinable with any of the other aspects can include the following features. The system is further configured to inject an amine into the fluid-filled volume, the amine reactive with at least a portion of the carbon dioxide to form at least a portion of the bicarbonate.

The details of one or more implementations of the disclosure are set forth in the accompanying drawings and the description that follows. Other features, objects, and advantages of the disclosure will be apparent from the description and drawings, and from the claims.

DETAILED DESCRIPTION

Figure 1:
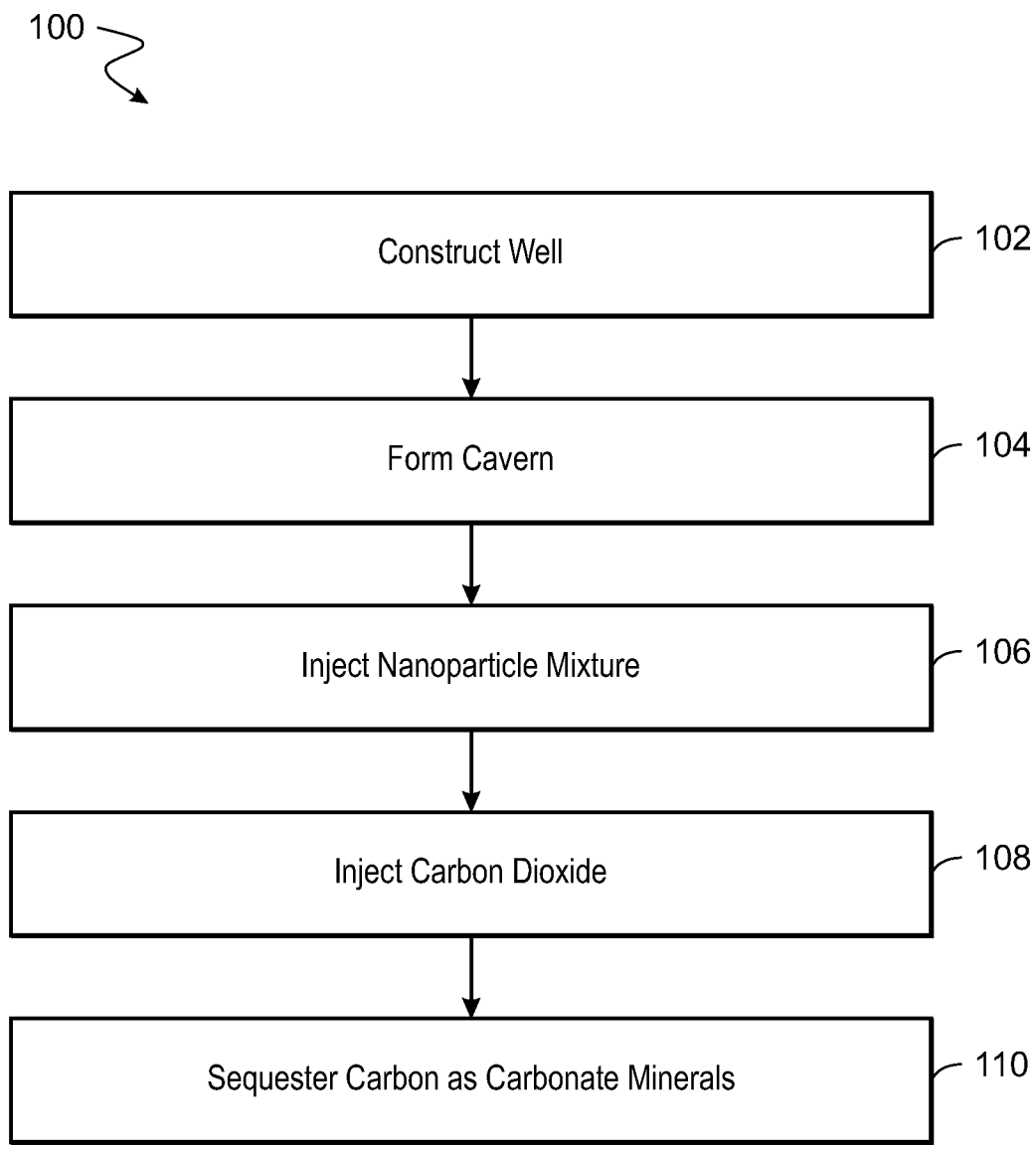
FIG. 1 is a process flow chart of an example of a method for sequestering carbon in a subterranean zone in accordance with an embodiment of the present disclosure.

Reference will now be made in detail to certain embodiments of the disclosed subject matter, examples of which are illustrated in part in the accompanying drawings. While the disclosed subject matter will be described in conjunction with the enumerated claims, it will be understood that the exemplified subject matter is not intended to limit the claims to the disclosed subject matter.

Subterranean fluid-filled volumes such as salt caverns can be suitable locations for sequestration of carbon from carbon dioxide. In some circumstances, the boundaries of the volume are sufficiently sealed (for example, by geological formations above or surrounding the volume) such that carbon dioxide can be injected into the volume and sequestered due to the physically entrapment of the liquid carbon dioxide within the volume. However, such physical trapping can be limited by imperfect sealing of the volume which can allow for the liquid carbon dioxide to flow out of the volume and potentially back to the surface. Alternatively or in addition, the carbon dioxide can be sequestered within the subterranean volume via a mineralization reaction. Specifically, carbon dioxide can be injected together with or into an aqueous solution (for example, together with an aqueous carrier fluid or into a brine already present in the subterranean volume) and carbon species formed from the carbon dioxide can react with metal cations dissolved in the aqueous solution to form carbonate minerals. The following are examples of an initial aqueous equilibria for some such reactions (using calcium, magnesium, and aluminum as non-limiting examples):

$$CO_2(g) \rightleftharpoons CO_2(aq) \quad \text{eq.1}$$

$$CO_2 + H_2O \rightleftharpoons H_2CO_3 \quad \text{eq.2}$$

$$H_2CO_3 \rightleftharpoons HCO_3^- + H^+ \quad \text{eq.3}$$

$$HCO_3^- \rightleftharpoons CO_3^{2-} + H^+ \quad \text{eq.4}$$

$$Ca^{2+} + HCO_3^- \rightleftharpoons CaCO_3 + H^+ \quad \text{eq.5}$$

$$Mg^{2+} + HCO_3^- \rightleftharpoons MgCO_3 + H^+ \quad \text{eq.6}$$

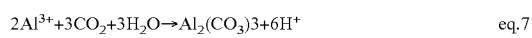

$$2Al^{3+} + 3CO_2 + 3H_2O \rightarrow Al_2(CO_3)_3 + 6H^+ \quad \text{eq.7}$$

Because the carbon is in the form of solid carbonate particles, sequestration by mineralization can be advantageous over other forms of carbon trapping as it does not require complete fluid sealing of the subterranean zone. However, the availability of metal cations within the aqueous solution can be a limiting factor of such mineralization. Whereas in some geological environments (such as basalt formations) such metal cations can be readily available, sequestration in other environments (such as salt caverns) may be limited by metal cations being less readily available.

In accordance with embodiments of the present disclosure, silicate nanoparticles are injected into a subterranean volume, either as a separate injection step from carbon dioxide injection or along with carbon dioxide as a mixture. Decomposition of the silicate nanoparticles can provide at least a portion of the metal cations available for carbon mineralization within the subterranean zone. The following are examples of such decomposition reactions (using calcium, aluminum, and magnesium as non-limiting examples):

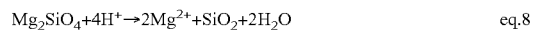

$$Mg_2SiO_4 + 4H^+ \rightarrow 2Mg^{2+} + SiO_2 + 2H_2O \quad \text{eq.8}$$

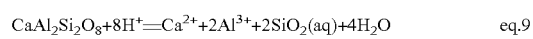

$$CaAl_2Si_2O_8 + 8H^+ \rightleftharpoons Ca^{2+} + 2Al^{3+} + 2SiO_2(aq) + 4H_2O \quad \text{eq.9}$$

By providing additional cations for the carbonation reactions, the rate and volume of carbon sequestration can thereby be increased or otherwise optimized and a greater proportion of carbon can be trapped in solid carbonate mineral form, thus preventing or minimizing carbon migration from the subterranean zone. Furthermore, in accordance with some embodiments of the present disclosure, less water is required for sequestration operations as compared to conventional sequestration operations. In some embodiments, the method and system of the present disclosure can be integrated with other sequestration methods and systems. For example, one portion of a subterranean zone (for example, one layer of a geological formation) can be utilized for physical trapping of liquid carbon dioxide, and another portion (for example, another layer of the geological formation) can be used for the enhanced mineralization sequestration operations of the present disclosure.

FIG. 1 is a process flowchart of a method 100 for subsurface sequestration of carbon in accordance with an embodiment of the present disclosure. FIGS. 2A-2E are schematic illustrations of a carbon sequestration operation 200 in accordance with an embodiment of the present disclosure, including a well 202 drilled from a surface 206 into a subterranean zone 204. The method of FIG. 1 is herein described in reference to the system and components of FIGS. 2A-2E; however, it will be understood that, in some embodiments of the present disclosure, the method of FIG. 1 can include fewer or additional steps and can be applied to other suitable systems and components, and likewise that, in some embodiments of the present disclosure, the operation 200 of FIGS. 2A-2E can be utilized in some or all of the steps of FIG. 1, steps in addition to those described in FIG. 1, and other suitable method and method steps.

Figure 2A:
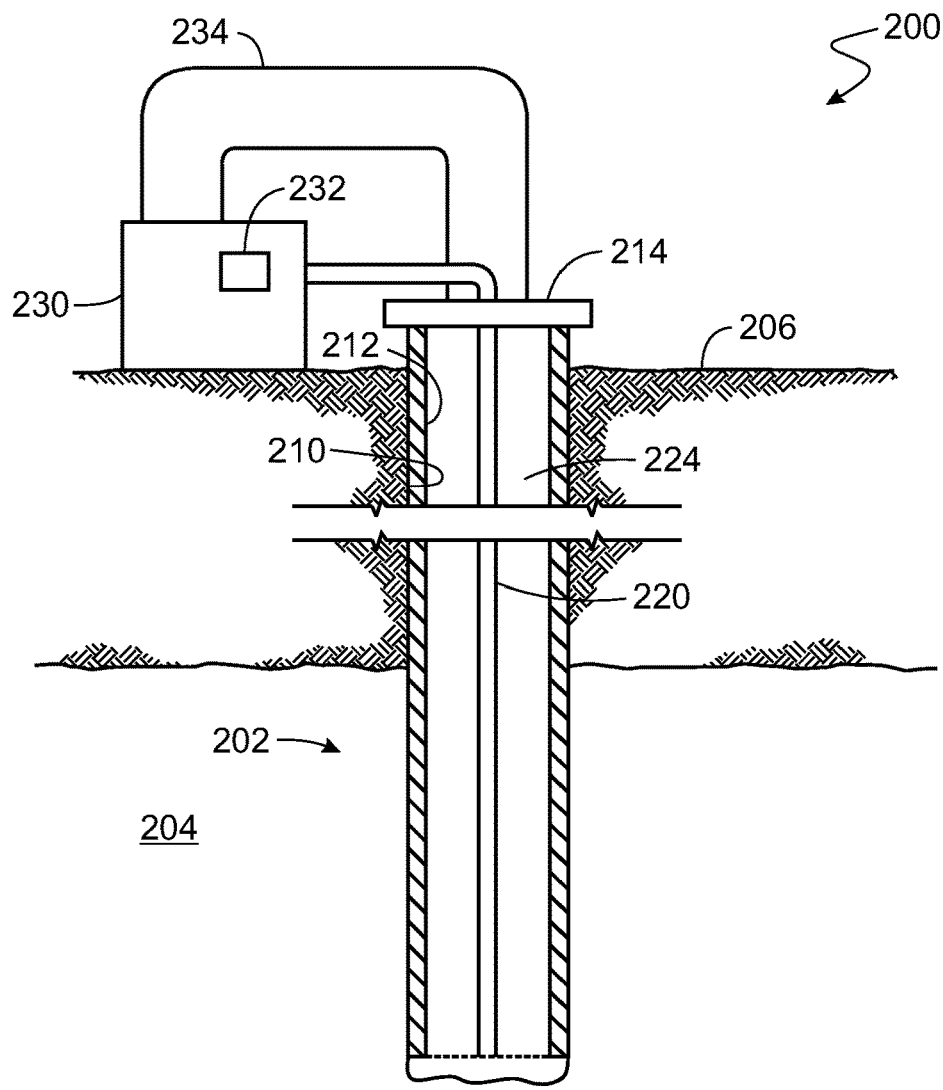
FIGS. 2A-2E are schematic illustrations of a carbon sequestration operation in accordance with an embodiment of the present disclosure.

Beginning at step 102 of method 100, and referring first to FIG. 2A, well 202 is constructed including a wellbore 210, casing 212, and well head 214. The wellbore 210 can be a vertical bore or a horizontal or otherwise deviated bore. The casing 212 can be cemented or otherwise suitably secured in the wellbore 210. In some implementations, the wellbore 210 can intersect a plurality of subterranean zones or formations. In some embodiments, a sequestration operation can include a plurality of wells drilled into one or more subterranean zones or formations.

In the illustrated embodiment, inner tubing 220 can be disposed within casing 212, such that an annulus 224 is formed between the outer surface of inner tubing 220 and the inner surface of casing 212. Inner tubing 220 can comprise a tubing string comprising a plurality of tubing segments, coiled tubing, or other suitable tubing. In some embodiments, well 202 is a partially or fully open hole well in which all or a portion of wellbore 210 is uncased (such that the annulus in those portions is formed between the outer surface of the inner tubing and the inner surface of the uncased wellbore).

In the illustrated embodiment, one or more pump and retrieval systems 230 can be coupled to well 202 at the surface 206 or another suitable location. Pump and retrieval system 230 can include pumps, tanks, compressors, and other suitable equipment for handling fluid such as treatment compositions, carbon dioxide, and/or other substances. The pump and retrieval systems 230 can be controlled by control module 232 and can include mobile vehicles or equipment (such as skids or other suitable structures) and can include control and analysis module 232 which can control the equipment and enable the measurement and analyses of fluid parameters such as pressure, temperature, pH, and other suitable operational or environmental parameters. As described in greater detail below, pump and retrieval system 230 can pump such fluid downhole through inner tubing 220 and into subterranean zone 204. Fluid pumped downhole can return through annulus 224 and thence through return line 234 to pump and retrieval system 230 (or another suitable location) for further handling, purification, diluting, recycling, analysis or other suitable processes.

Figure 2B:
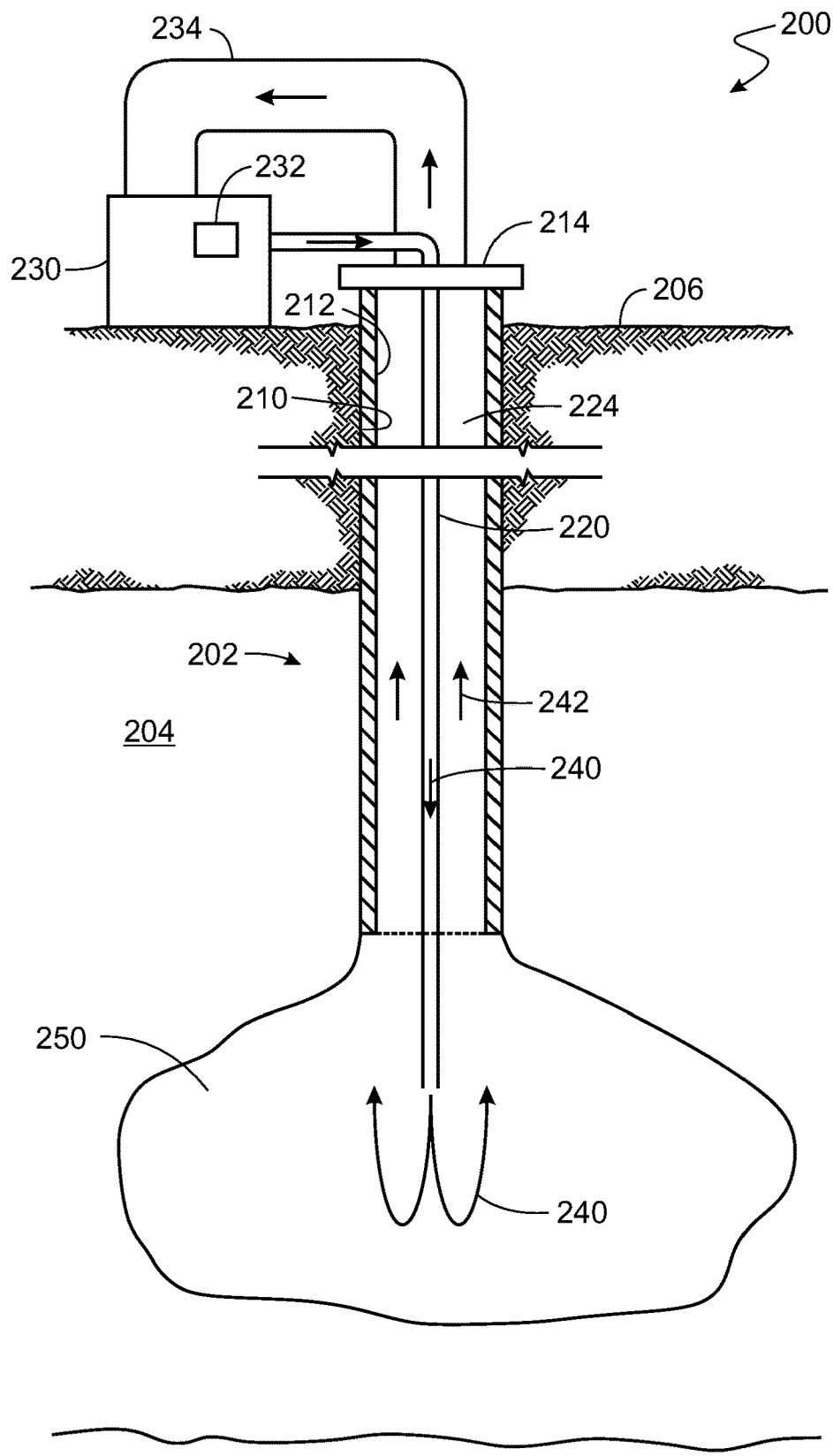

Proceeding to step 104, and as illustrated in FIG. 2B, a fluid-filled volume 150 is created by circulation of an aqueous solution 240 injected through inner tubular 220. Aqueous solution 240 leaches the in situ minerals by dissolution, and return flow 242 carries the dissolved components in solution back uphole via annulus 224. In some embodiments, the dissolved components can be removed from the solution such that fluid can be then recycled by re-injecting it. In some embodiments, aqueous solution 240 as it is injected downhole includes no such recycled fluid. Continued circulation and the resulting continued leaching can expand the fluid-filled volume 150 until it has dimensions suitable for the remaining steps of the sequestration operation described below in reference to steps 106 and 108. In some embodiments, such enlargement can continue as steps 106 and 108 are performed.

In the illustrated embodiment, subterranean zone 204 is a sedimentary deposit comprised of halite and volume 150 is an artificially created salt cavern. In some embodiments, subterranean zone 204 is a salt dome. In some embodiments, subterranean zone 204 is comprised of other easily-dissolvable minerals and/or is comprised of other rock types or combinations of rock types and otherwise having geological characteristics (such as structure, vertical thickness, and lithology) such that a cavern volume can be similarly created using such artificial means. In some embodiments, subterranean zone 204 can be at a depth of, for example, greater than five hundred meters from surface 206 (for example, one-thousand meters, two-thousand meters, three thousand meters, or greater). In some embodiments, volume 150 can have a diameter of at least 25 meters (for example, 100 meters or larger). (It will be understood that, in some embodiments, the wellbore is drilled into a naturally-occurring fluid-filled volume (such as a limestone cave) which can be utilized for the sequestration operations described herein, such that it in some embodiments it may be not necessary or not desirable to perform step 104 and the method can proceed directly to the next steps after step 102.)

Figure 2C:
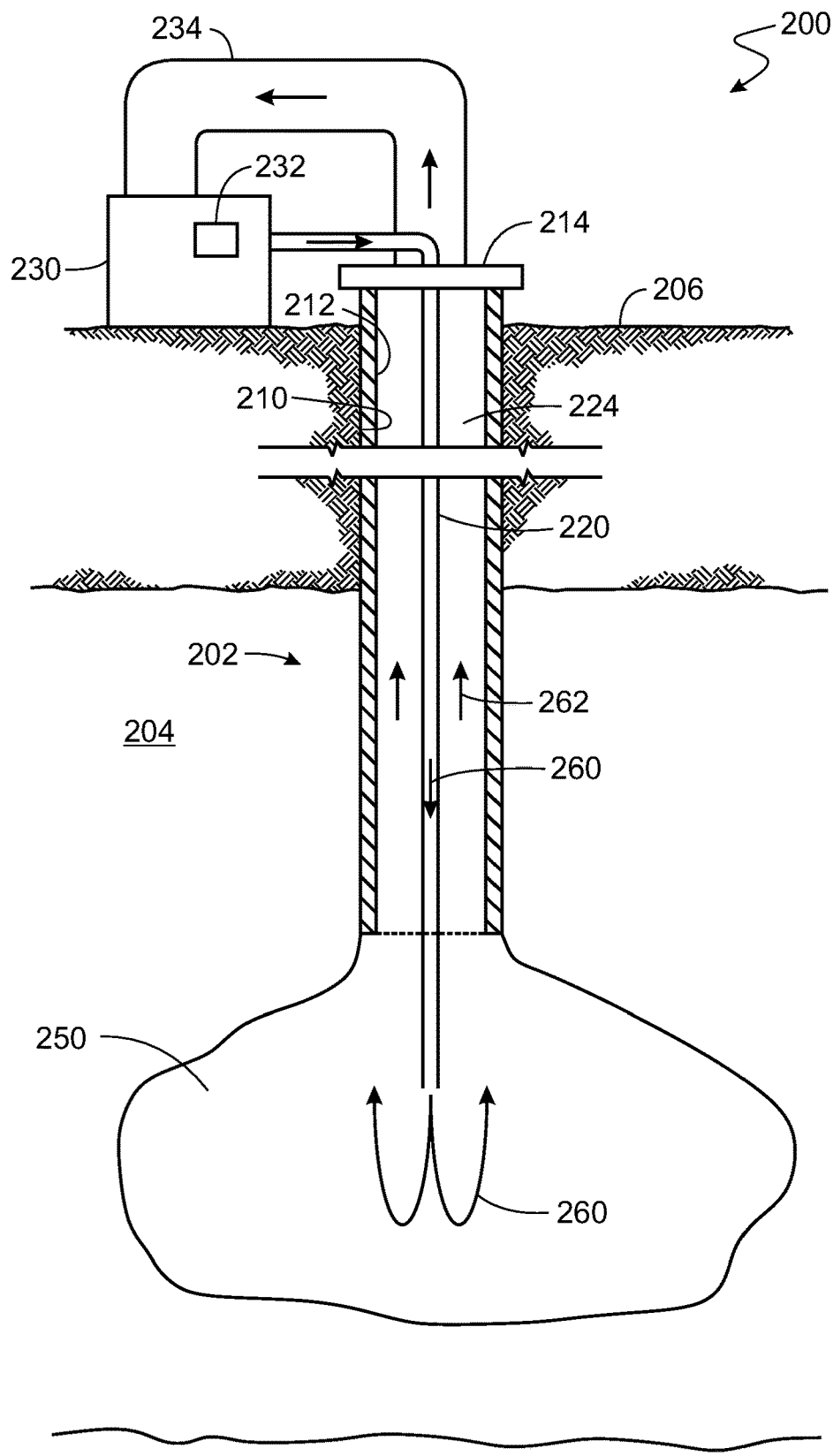

Proceeding to step 106, and as shown in FIG. 2C, a mixture 260 of silicate nanoparticles suspended in an acidic solution is injected into fluid-filled volume 150. In some embodiments, the silicate nanoparticles are approximately 250 nm (+/−50 nm). In some embodiments, the silicate nanoparticles comprise basalt nanoparticles formed using a ball milling methodology the same or similar to the one described in Mishra et al., Basalt nanoparticle reinforced hybrid woven composites: Mechanical and thermo-mechanical performance, Fibers and Polymers 18, 2433-2442 (2017). Such natural basalt particles can be more economical to produce than nanoparticles of similar composition manufactured or produced in other ways. In some embodiments, the nanoparticles can be in the form of irregular nano-husks and/or self-oriented flowers. In some embodiments, mixture 260 can include particles of different sizes and compositions and can include additional fluid or solid components. The larger cumulative surface area and faster reaction kinetics of a mass of nanoparticles (with respect to the reactions of equations 3 and 4 above) can make it advantageous to use nanoparticles in step 106 as compared to an equivalent mass of particles of a larger size.

In some embodiments, the acidic solution can comprise 0.1M carbonic acid, 0.1 M HCl, or 0.1M $H_2SO_4$, or another suitable mixture and can have a pH of less than 4 (for example, between about 0.5 and about 3.68). The composition of the solution can be selected based on the properties of the geological formation within which the subterranean volume resides, or other suitable factors. In some embodiments, the mixture comprises about ten (10) mass parts basalt nanoparticles, about fourteen (14) mass parts of sulfuric acid ($H_2SO_4$), and about ten (10) to about one-hundred (100) mass parts water. In some embodiments, the aforesaid mixture is part of a first injection which is followed by a second mixture injection. In some embodiments, a portion of the mixture is flowed back out of the well (for example, as part of return flow 262 of FIG. 2C) and is at least partially regenerated for the second (or a subsequent) injection. In some embodiments, the second mixture injection is less acidic and comprises about ten (10) mass parts basalt nanoparticles, about two (2) mass parts of sulfuric acid ($H_2SO_4$), and about ten (10) to about one-hundred (100) mass parts water.

In some circumstances, the rate of mineralization can be undesirably slow due to low carbon dioxide solubility in water and slow reaction kinetics. So as to at least partially mitigate this factor, in some embodiments, an accelerant can be included in the mixture to speed up the process of mineralization. For example, in some embodiments, the accelerant can be an amine (R—$NH_2$) which can accelerate the mineralization by facilitating the conversion of carbon dioxide to bicarbonate. Such reaction can in some embodiments be, for example, as follows (in which R—$NH_2$ is an amine accelerant and M is a metal cation):

$$[M](OH)_2 \rightarrow [M]^{2+} + 2OH^- \qquad \text{eq.10}$$

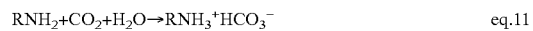

$$RNH_2 + CO_2 + H_2O \rightarrow RNH_3^+ HCO_3^- \qquad \text{eq.11}$$

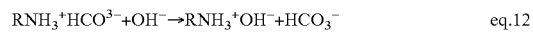

$$RNH_3^+ HCO^{3-} + OH^- \rightarrow RNH_3^+ OH^- + HCO_3^- \qquad \text{eq.12}$$

$$HCO_3^- \rightarrow CO_3^{2-} + H^+ \qquad \text{eq.13}$$

$$CO_3^{2-} + [M]^{2+} \rightarrow [M]CO_3 \qquad \text{eq.14}$$

$$H^+ + OH^- \rightarrow H_2O \qquad \text{eq.15}$$

$$RNH_3 + OH^- \rightarrow RNH_2 + H_2O \qquad \text{eq.16}$$

In the above equations, M is a metal cation (such as calcium, magnesium, barium, or another suitable cation) and R is a functional group such as $CH_3$, $NH_2$—$CH_2$—$CH_2$, $C_3H_8$, etc. Because the reactant R—$NH_2$ is consumed in equation 10 and recovered in in equation 16, it can be considered as a catalyst and preserved in the system. Suitable amines can include, for example, ethylenediamine, tetraethyl amine, diethylamine, tri-ethylamine, ethanol-amine, or di-ethanol amine.

In some embodiments, silica dioxide produced from the reactions shown in equations 8 and 9 can be recovered as part of return flow 262 as a byproduct of the sequestration operation and used in other processes such as water treatment, coatings, inks, and others.

Figure 2D:
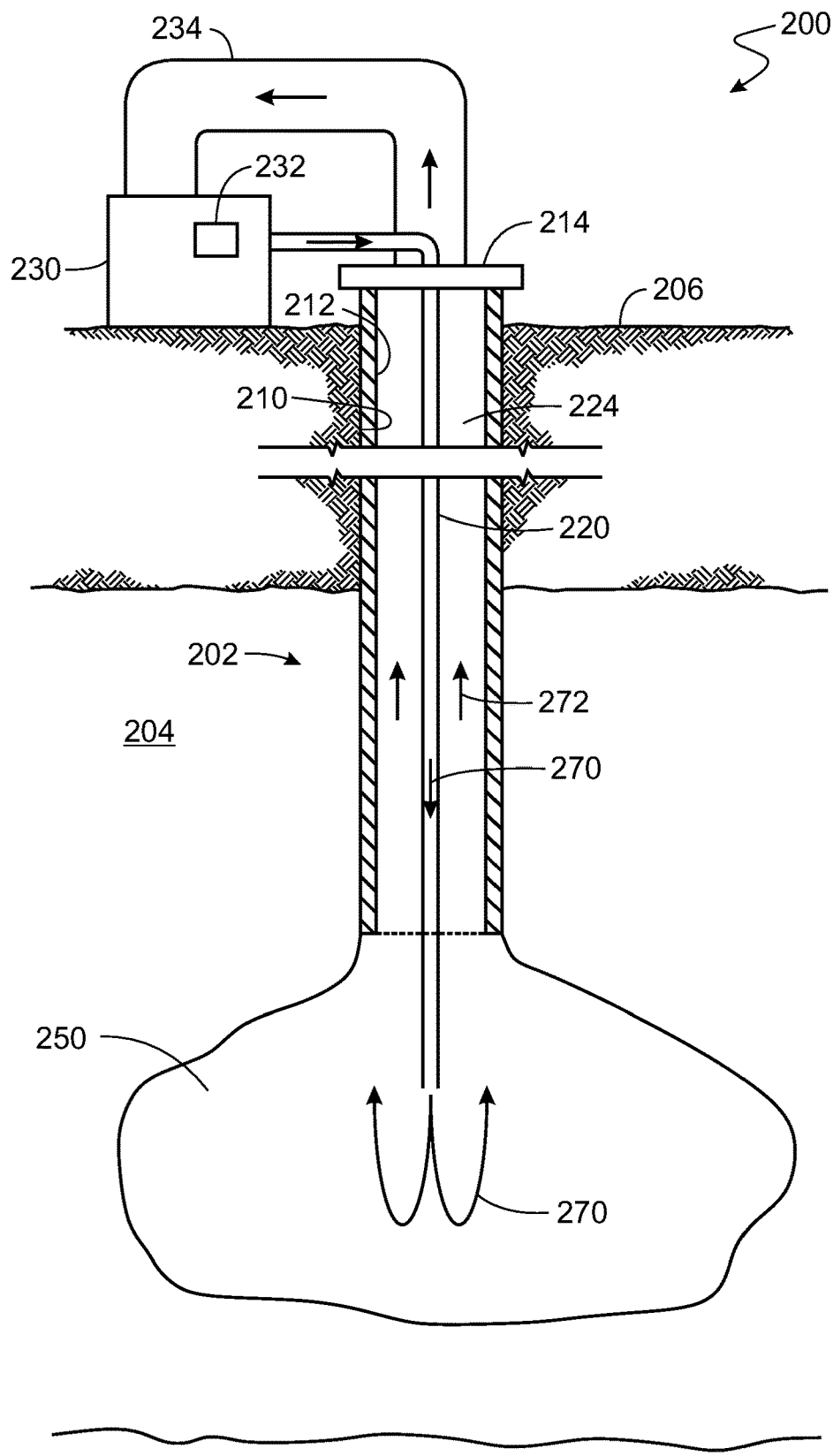

Proceeding to step 108, and as shown in FIG. 2D, carbon in the form of carbon dioxide 270 is injected into volume 150. The injected carbon dioxide 270 can in some embodiments be in gas, liquid, or supercritical form. In some embodiments, the carbon dioxide can be part of a mixture that also includes silicate nanoparticles of, for example, the type described above in relation to step 106, and/or other solid or fluid components. In some embodiments, such a mixture can comprise about ten (10) mass parts nanoparticles and about thirty (30) mass parts carbon dioxide. In some embodiments, a portion of the carbon dioxide not sequestered is returned to the surface via return flow 272 and can, in some embodiments, be reinjected (in whole or in part) for subsequent sequestration.

Figure 2E:
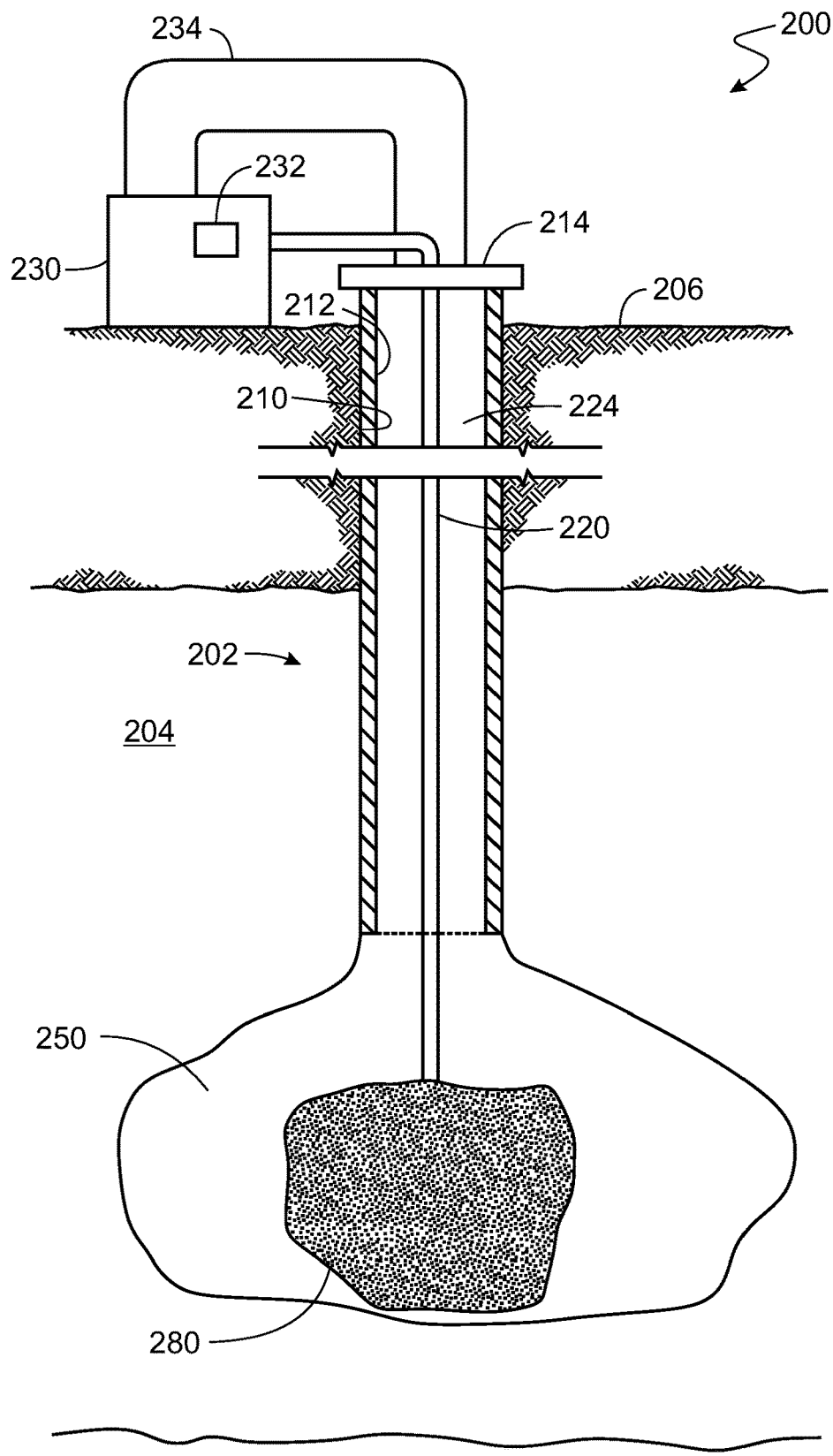

Proceeding to step 110, and as shown in FIG. 2E, by virtue of the equations described above, a least a portion of the carbon from injected carbon dioxide 270 is sequestered by precipitation of carbonate minerals 280 formed from reaction of metal cations with bicarbonate formed from the carbon dioxide, and at least a portion of the metal cations are a product of decomposition of the silicate nanoparticles in the acidic solution. In some embodiments, some or all of the mineralization can occur while injection steps 104, 106, and/or 108 are occurring. In some embodiments, some or all of steps 104, 106 and 108 can be fully or partially combined by injecting as a single step or in multiple steps an acidic aqueous mixture that includes both carbon dioxide and nanoparticles. In the embodiment shown in FIGS. 2A-2E, the same inner tubing 220 as used to inject the aqueous solution in step 104 is used to inject the acidic mixture in step 108 and also used inject the carbon dioxide in step 108 (that is, the injection and fluid return operations of those steps use a common (i.e., the same) tubular and a common annulus defined (in part) by the outer surface of the tubular). In some embodiments, a different injection tubulars and/or different return pathways can be used for some or all of steps 104, 106, and 108.

In some embodiments, a monitoring well (which can be well 102 or a separate well) can be used to monitor and control the fluid pressure within the volume and to measure and monitor the pressure, temperature, pH, composition, and/or other chemical or physical characteristics of return flows 242, 262, and/or 272, and other operational characteristics. Based on a determination of changes in such measured characteristics, an operator may modify the volume or composition of the mixture. For example, the degree and rate of mineralization can in some embodiments be determined or estimated based on such parameters, and operations can be adjusted accordingly so as to accomplish the sequestration goals. According to equations 8 and 9, $SiO_2$ is increased when the silicate nanoparticles are decomposed into $Mg^{2+}$ or $Ca^{2+}$ or $Al^{3+}$. Similarly, when carbonate minerals are formed, more $H^+$ ions are generated and decrease in pH can indicate maximum mineralization. Therefore, for example, a decrease $SiO_2$ content, an increase in bicarbonate, and/or an increase in pH can indicate that the system is approaching maximum mineralization capacity, and an operator may therefore decide to increase the rate or amount of particulates injection so as to increase the mineralization capacity of the system. In some embodiments, at or close to the end of sequestration operations or another suitable time, the mineralization can act to seal pores and spaces proximate the wellbore and can thereby further seal the volume against undesirable subsequent carbon dioxide migration.

The term "uphole" as used herein means in the direction along a tubing or the wellbore from its distal end towards the surface, and "downhole" as used herein means the direction along a tubing or the wellbore from the surface towards its distal end. A downhole location means a location along the tubing or wellbore downhole of the surface.

The term "about" as used in this disclosure can allow for a degree of variability in a value or range, for example, within 10%, within 5%, or within 1% of a stated value or of a stated limit of a range. The term "substantially" as used in this disclosure refers to a majority of, or mostly, as in at least about 50%, 60%, 70%, 80%, 90%, 95%, 96%, 97%, 98%, 99%, 99.5%, 99.9%, 99.99%, or at least about 99.999% or more.

As used in this disclosure, the term "subterranean material" or "subterranean zone" refers to any material under the surface of the earth, including under the surface of the bottom of the ocean. For example, a subterranean zone or material can be any section of a wellbore and any section of a geological formation or region in fluid contact with the wellbore.

A number of implementations of the disclosure have been described. Nevertheless, it will be understood that various modifications may be made without departing from the spirit and scope of the disclosure.

The invention claimed is:

1. A method for subsurface sequestration of carbon in a subterranean zone, the method comprising:
    forming a fluid-filled volume in the subterranean zone by injecting, into the subterranean zone, an aqueous solution;
    injecting, into the fluid-filled volume, a mixture comprising silicate nanoparticles suspended in an acidic solution having a pH of less than 4;
    injecting carbon as carbon dioxide into the fluid-filled volume;
    sequestering a least a portion of the carbon in the fluid-filled volume by precipitation of carbonate minerals in the fluid-filled volume, at least a portion of the carbonate minerals formed from reaction of metal cations with bicarbonate formed from the carbon dioxide, wherein at least a portion of the metal cations are a product of decomposition of the silicate nanoparticles in the acidic solution; and
    determining a change in a chemical or physical characteristic of a return flow of fluid from the fluid-filled volume and, based on such determination, modifying a volume or composition of the mixture.

2. The method of claim 1, wherein the mixture and the carbon dioxide are injected into the fluid-filled volume through a common tubing disposed within a wellbore.

3. The method of claim 1, wherein at least a portion of the carbon dioxide is included in the mixture comprising the silicate nanoparticles.

4. The method of claim 1, wherein the fluid-filled volume of the subterranean zone is a salt cavern.

5. The method of claim 1, wherein the aqueous solution, the mixture, and the carbon dioxide are injected into the fluid-filled volume through a common tubing disposed within a wellbore.

6. The method of claim 1, wherein the mixture comprising silicate nanoparticles in the acidic solution comprises at least a portion of the aqueous solution.

7. The method of claim 1, wherein the acidic solution comprises 0.1 M sulphuric acid.

8. The method of claim 1, wherein the acidic solution comprises 0.1 M hydrochloric acid.

9. The method of claim 1, wherein the acid solution comprises 0.1 M carbonic acid.

10. The method of claim 1, further comprising injecting an amine into the fluid-filled volume, the amine reactive with at least a portion of the carbon dioxide to form at least a portion of the bicarbonate.

11. The method of claim 1, wherein the silicate nanoparticles comprise milled basalt particles.

12. A method for subsurface sequestration of carbon in a subterranean zone, the method comprising:
    forming a fluid-filled volume in the subterranean zone by injecting, into the subterranean zone, an aqueous solution;
    injecting, into the fluid-filled volume, a mixture comprising silicate nanoparticles suspended in an acidic solution having a pH of less than 4;
    injecting carbon as carbon dioxide into the fluid-filled volume;
    injecting an amine into the fluid-filled volume; and
    sequestering a least a portion of the carbon in the fluid-filled volume by precipitation of carbonate minerals in the fluid-filled volume, at least a portion of the carbonate minerals formed from reaction of metal cations with bicarbonate formed from reaction of the amine with the carbon dioxide, wherein at least a portion of the metal cations are a product of decomposition of the silicate nanoparticles in the acidic solution.

* * * * *

UNITED STATES PATENT AND TRADEMARK OFFICE
CERTIFICATE OF CORRECTION

PATENT NO. : 12,031,414 B2  
APPLICATION NO. : 17/948835  
DATED : July 9, 2024  
INVENTOR(S) : Abdulaziz S. Al-Qasim, Anton Manakhov and Yuguo Wang Page 1 of 1

It is certified that error appears in the above-identified patent and that said Letters Patent is hereby corrected as shown below:

On the Title Page

Column 2, (Item (57) Abstract), Line 7, please replace "a least" with -- at least --

Column 2, (Item (57) Abstract), Line 11, please replace "least" with -- at least --

In the Claims

In Column 8, Line 50, Claim 1, please replace "a least" with -- at least --

In Column 10, Line 13, Claim 12, please replace "a least" with -- at least --

Signed and Sealed this  
Twenty-sixth Day of November, 2024

Katherine Kelly Vidal  
*Director of the United States Patent and Trademark Office*